US012153334B2

United States Patent
Chen et al.

(10) Patent No.: US 12,153,334 B2
(45) Date of Patent: Nov. 26, 2024

(54) MONOLITHIC LCD PROJECTOR

(71) Applicant: Formovie (Chongqing) Innovative Technology Co., Ltd., Chongqing (CN)

(72) Inventors: Chen Chen, Chongqing (CN); Jiansheng Xiao, Chongqing (CN); Lingxun Xia, Chongqing (CN); Hao Jiang, Chongqing (CN); Zhuhua Cao, Chongqing (CN)

(73) Assignee: Formovie (Chongqing) Innovative Technology Co., Ltd., Chongqing (CN)

( * ) Notice: Subject to any disclaimer, the term of this patent is extended or adjusted under 35 U.S.C. 154(b) by 78 days.

(21) Appl. No.: 17/939,298

(22) Filed: Sep. 7, 2022

(65) Prior Publication Data
US 2023/0075173 A1 Mar. 9, 2023

(30) Foreign Application Priority Data

Sep. 9, 2021 (CN) .......................... 202111055392.8

(51) Int. Cl.
*G03B 21/00* (2006.01)
*G02F 1/1335* (2006.01)
*G02F 1/13363* (2006.01)
*G03B 21/20* (2006.01)

(52) U.S. Cl.
CPC ..... *G03B 21/006* (2013.01); *G02F 1/133502* (2013.01); *G02F 1/133536* (2013.01); *G02F 1/133638* (2021.01); *G03B 21/2073* (2013.01); *G02F 2201/08* (2013.01)

(58) Field of Classification Search
CPC .......................... G03B 21/006; G02F 1/133536
See application file for complete search history.

(56) References Cited

U.S. PATENT DOCUMENTS 5,844,637 A 12/1998 Katsumata

FOREIGN PATENT DOCUMENTS

| CN | 1360218 A | | 7/2002 |
|---|---|---|---|
| JP | H11295660 A | * | 10/1999 |
| JP | 2002131541 A | | 5/2002 |
| JP | 2007233410 A | | 9/2007 |
| JP | 2008065137 A | | 3/2008 |
| JP | 2008170583 A | | 7/2008 |

OTHER PUBLICATIONS

First Office Action issued in counterpart Chinese Patent Application No. 202111055392.8, dated Oct. 9, 2022.

* cited by examiner

*Primary Examiner* — Paisley L Wilson
(74) *Attorney, Agent, or Firm* — Westbridge IP LLC

(57) ABSTRACT

Disclosed is a monolithic LCD projector, including: a light source, a polarizer provided on a light emitting side of the light source and configured for converting light emitted from the light source into linearly polarized light, an LCD panel provided on a light emitting side of the polarizer and configured for modulating the linearly polarized light according to an image signal to generate modulated light, an analyzer provided on a light emitting side of the LCD panel and separated from the LCD panel and obliqued, the analyzer includes a reflective polarizer and a functional structure, and a lens provided in a reflected light path of the analyzer and configured for projecting the second polarization state light reflected by the reflective polarizer.

10 Claims, 4 Drawing Sheets

MONOLITHIC LCD PROJECTOR

CROSS-REFERENCE TO RELATED APPLICATIONS

This application claims priority to Chinese Patent Application No. 202111055392.8, filed on Sep. 9, 2021, the entire contents of which is incorporated herein by reference.

TECHNICAL FIELD

The present application relates to the technical field of projectors, and in particular to a monolithic LCD projector.

BACKGROUND

A projector, as a device, can project an image or a video onto a screen for display, and is widely used in homes, offices, schools or cinemas. A monolithic liquid crystal display (LCD) projector is popular among consumers because of its simple structure and low cost.

Generally, LCD modules used in a monolithic LCD projector include an LCD display screen, a thin film transistor (TFT) side polarizer and a color filter (CF) side polarizer, the TFT side polarizer and the CF side polarizer are laminated to both sides of the LCD display screen. The LCD module in a monolithic LCD projector receives light of a high intensity, and because elements in the LCD module, such as the TFT side polarizer, the RGB filter film, the Black Matrix (BM) film layer, and the CF side polarizer in the CF substrate, adsorb light, and convert light energy into heat, thus the operating temperature of the LCD module becomes very high, and the high temperature may cause the liquid crystal in the LCD module to fail and lose its modulating capability.

In addition, the picture projected by the monolithic LCD projector also has a problem of low contrast and even ghost.

SUMMARY

The present application provides a monolithic LCD projector, which aims to solve the problems existing in the related art.

To solve the above technical problems, embodiments of the present application provide a monolithic liquid crystal display (LCD) projector, including:
  a light source;
  a polarizer, provided on a light emitting side of the light source and configured for converting light emitted from the light source into linearly polarized light;
  an LCD panel, provided on a light emitting side of the polarizer and configured for modulating the linearly polarized light according to an image signal to generate modulated light, wherein the modulated light comprises a first polarization state light and a second polarization state light;
  an analyzer, provided on a light emitting side of the LCD panel and separated from the LCD panel, wherein the analyzer is obliqued to an optical axis of the modulated light emitted from the LCD panel, the analyzer comprises a reflective polarizer and a functional structure that is provided on a side of the reflective polarizer away from the LCD panel, the reflective polarizer is configured for reflecting the second polarization state light and transmitting the first polarization state light, the functional structure is configured for making a ratio to be less than a preset value, the ratio is of a luminous flux of the first polarization state light in a reflected light path of the reflective polarizer to a luminous flux of the first polarization state light emitted from the LCD panel; and
  a lens, provided in a reflected light path of the analyzer and configured for projecting the second polarization state light reflected by the reflective polarizer.

The benefits of the present application are as follows. Since the analyzer is separated from the LCD panel, the heat generated by the analyzer is avoided to be directly conducted to the LCD panel, thus the problem is solved that the temperature of the LCD panel increases due to the heat absorption of the analyzer. The analyzer includes a reflective polarizer and a functional structure, and the reflective polarizer reflects the second polarization state light that is used to form the projected pictures to the lens, and the functional structure makes a ratio to be less than a preset value, the ratio is of a luminous flux of the first polarization state light in a reflected light path of the reflective polarizer to a luminous flux of the first polarization state light emitted from the LCD panel, the first polarization state light which is not beneficial to the projected pictures and enters the lens can be reduced or eliminated, to improve a contrast of the projected pictures and solve a problem of ghost.

In an embodiment, the functional structure comprises a glass substrate and an anti-reflection film, the glass substrate is attached to the side of the reflective polarizer away from the LCD panel, and the anti-reflection film is provided on a side of the glass substrate away from the reflective polarizer.

In an embodiment, a reflectivity between the functional structure and air is less than a preset reflectivity δ, the preset reflectivity δ is less than 1/(5*CR), wherein CR is an ANSI contrast achievable to the monolithic LCD projector.

In an embodiment, the functional structure comprises a glass substrate and a light-absorbing film, the glass substrate is attached to the side of the reflective polarizer away from the LCD panel, and the light-absorbing film is provided on a side of the glass substrate away from the reflective polarizer.

In an embodiment, the light-absorbing film is made of light-absorbing paint, carbon nanotubes or light-absorbing micro-nano structures.

In an embodiment, the functional structure comprises a quarter wave plate and a glass substrate, the quarter wave plate is attached to the side of the reflective polarizer away from the LCD panel, and the glass substrate is attached to a side of the quarter wave plate away from the reflective polarizer.

In an embodiment, an anti-reflection film or a light-absorbing film is provided on a side of the glass substrate away from the quarter wave plate.

In an embodiment, the functional structure comprises a support frame, and the support frame is fixed to the side of the reflective polarizer away from the LCD panel and fixed to an edge area of the reflective polarizer.

In an embodiment, the support frame is a rectangular frame, and the rectangular frame is fixed to four edges of the side of the reflective polarizer away from the LCD panel.

In an embodiment, the preset value is less than 1:100.

Additional aspects of the present application and its advantages will be given in part in the following description, parts of which will become apparent from the following description, or from the practice of the present application.

DETAILED DESCRIPTION OF THE EMBODIMENTS

The principles and features of the present application are described below in conjunction with the drawings, and the embodiments given are only used to explain the present application and are not intended to limit the scope of the present application.

First Embodiment

Figure 1:
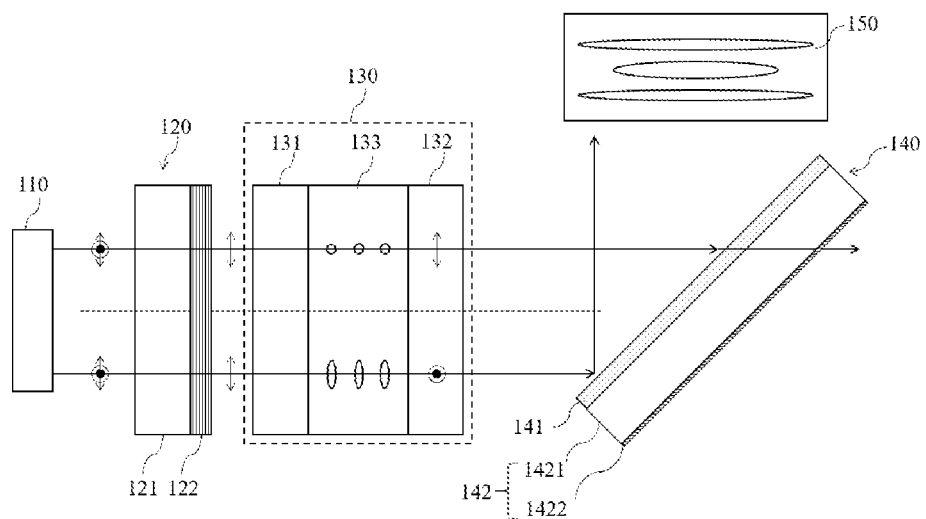
FIG. 1 is a schematic structural view of a monolithic LCD projector according to a first embodiment of the present application.

FIG. 1 shows a schematic structural view of a monolithic LCD projector according to a first embodiment of the present application. As shown in FIG. 1, the monolithic LCD projector includes a light source 110, a polarizer 120, an LCD panel 130, an analyzer 140, and a lens 150.

The light source 110 is configured for emitting light. The polarizer 120 is provided on a light emitting side of the light source 110 for converting the light emitted from the light source into linearly polarized light. The LCD panel 130 is provided on a light emitting side of the polarizer 120 and configured for modulating the linearly polarized light according to an image signal to generate modulated light. The modulated light includes a first polarization state light and a second polarization state light. The analyzer 140 is provided on a light emitting side of the LCD panel 130 and separated from the LCD panel 130. The analyzer 140 is obliqued to an optical axis of the modulated light emitted from the LCD panel 130. The analyzer includes a reflective polarizer 141 and a functional structure 142 that is provided on a side of the reflective polarizer away from the LCD panel. The reflective polarizer 141 is configured for reflecting the second polarization state light and transmitting the first polarization state light. The functional structure 142 is configured for making a ratio to be less than a preset value, the ratio is of a luminous flux of the first polarization state light in a reflected light path of the reflective polarizer 141 to a luminous flux of the first polarization state light emitted from the LCD panel. The preset value is less than 1:100. The lens is provided in a reflected light path of the analyzer and configured for projecting the second polarization state light reflected by the reflective polarizer.

In one embodiment, the light source 110 may be an LED light source, the LED light source emits white light to provide the monolithic LCD projector with the light required to form the projected pictures. The white light is natural light. The light source 110 may also be a white light source of laser-excited fluorescence, or other light source that produces white light.

The polarizer 120 is provided on the light emitting side of light source 110 for converting the light emitted from light source 110 into linearly polarized light. The linearly polarized light can be p-light, or s-light according to the actual situation. The polarizer 120 can include a glass substrate 121 and a polarizing polarizer 122. The polarizing polarizer 122 is attached to a side of the glass substrate 121 away from the light source 110. The polarizer 120 is separated from the LCD panel 130 to avoid heat transfer therebetween, and the heat generated by the polarizer 120 will not be directly conducted to the LCD panel 130, to avoid the influence of the heat generated by the polarizer 120 on the LCD panel 130 and to reduce the risk of failure of the liquid crystal material inside the LCD panel 130 due to high temperature.

The LCD panel 130 is provided on the light emitting side of the polarizer 120 and includes a CF substrate 131, a TFT substrate 132, and a liquid crystal material 133 between the TFT substrate and the CF substrate. The LCD panel 130 is configured for modulating the linearly polarized light emitted from the polarizer 120 according to an image signal to generate modulated light. The modulated light includes a first polarization state light and a second polarization state light. The second polarization state light has image information for forming projected pictures. When the LCD panel 130 is placed, the CF substrate 131 may face the light source 110, and the BM film on the CF substrate 131 prevents the light from directly irradiating the scanning lines, data lines, and other lines, to improve the lifetime of the LCD panel 130.

The analyzer 140 is provided on the light emitting side of the LCD panel 130 and is separated from the LCD panel 130, and the analyzer 140 is obliqued to the optical axis of the modulated light emitted from the LCD panel 130. The obliqued angle between the analyzer 140 and the optical axis of the modulated light emitted from the LCD panel 130 is 45°. In this embodiment, since the analyzer 140 is separated from the LCD panel 130, the heat generated by the analyzer 140 is avoided to be directly conducted to the LCD panel 130, to reduce the risk of failure of the liquid crystal material inside the LCD panel 130 due to high temperature.

The analyzer 140 includes a reflective polarizer 141 and a functional structure 142 that is provided on the side of the reflective polarizer 141 away from the LCD panel 130. The reflective polarizer 141 is configured for reflecting the second polarization state light and transmitting the first polarization state light. The reflective polarizer 141 reflects the second polarization state light that is used to form the projected pictures into a reflected light path and transmits the first polarization state light that is not used to form the projected pictures to a transmitting light path. The reflective polarizer 141 can be a multilayer birefringence polarizer or a metal wire grid polarizer, etc.

Figure 2:
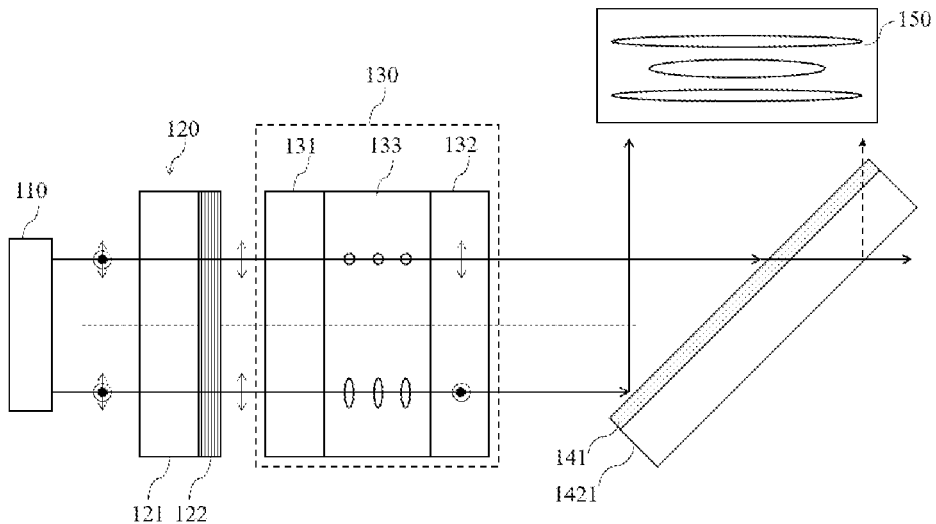
FIG. 2 is a schematic structural view of a comparison embodiment of monolithic LCD projectors according to the first embodiment of the present application.

It should be noted that, as shown in FIG. 2, if the analyzer only uses a common glass substrate 1421 as a carrier substrate of the reflective polarizer 141, as mentioned before, the reflective polarizer 141 reflects the second polarization state light emitted from the LCD panel 130 and transmits the first polarization state light. During projecting, for the first polarization state light, since a refractive index of the glass substrate 1421 differs greatly from that of the air, there is a Fresnel reflection caused due to the refractive index mismatch on a surface where the glass substrate 1421 is in contact with the air. Some of the first polarization state light after passing through the reflective polarizer 141 will be reflected on an interface between the glass substrate 1421 and the air, then into the lens, and then projected onto the projection screen by the lens 150, to form bright light corresponding to the first polarization state light on the projection screen. The second polarization state light is reflected to the lens through the reflective polarizer 141 and then projected onto the projection screen through the lens to form the projected pictures, but the bright light formed by the reflection of the first polarization state light will interfere with the projected pictures projected by the second polarization state light, to result in a reduced contrast of the projected pictures and even generate ghost.

In this embodiment, a functional structure 142 is provided on the side of the reflective polarizer 141 away from the LCD panel. On the one hand, the functional structure 142 is used to carry the reflective polarizer 141, and on the other hand, the functional structure 142 is used to make a ratio to be less than a preset value, the ratio is of a luminous flux of the first polarization state light in a reflected light path of the reflective polarizer 141 to a luminous flux of the first polarization state light emitted from the LCD panel 130, thus the first polarization state light which is not beneficial to the projected pictures and enters the lens can be reduced or eliminated, to improve a contrast of the projected pictures and solve a problem of ghost. The preset value is less than 1:100. It is understood that the smaller the preset value, the less the first polarization state light enters the lens, the more beneficial to improve the contrast of the projected pictures. The preset value can be 1:1000, 1:2000 or other values according to the actual condition.

Figure 3:
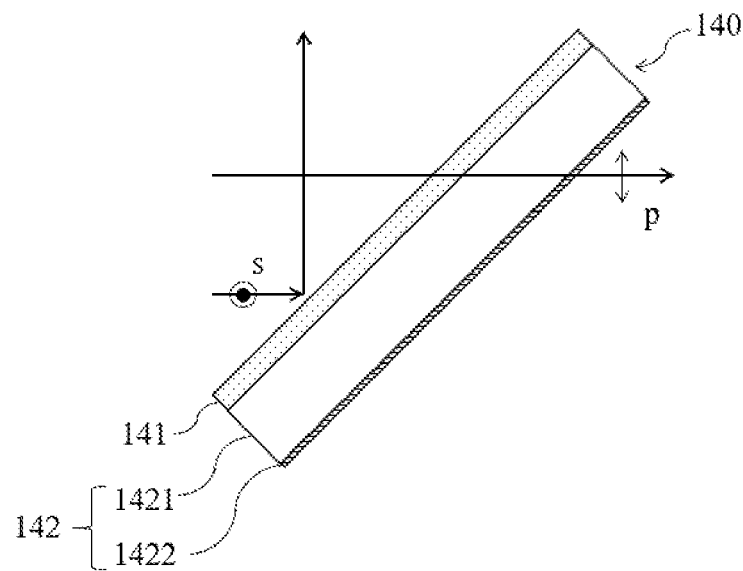
FIG. 3 is a schematic structural view of an analyzer according to the first embodiment of the present application.

In one embodiment, as shown in FIGS. 1 and 3, the analyzer 140 includes a reflective polarizer 141, a glass substrate 1421 and an anti-reflection film 1422. The glass substrate 1421 is attached to the side of the reflective polarizer 141 away from the LCD panel 130, and the anti-reflection film 1422 is provided on the side of the glass substrate 1421 away from the reflective polarizer 141. The glass substrate 1421 and the anti-reflection film 1422 form a functional structure 142.

In this embodiment, the reflective polarizer 141 can reflect s-light and transmit p-light, the first polarization state light is p-light and the second polarization state light is s-light. When the first polarization state light (p-light) passing through the reflective polarizer 141 enters an interface between the glass substrate 1421 and the air, the first polarization state light (p-light) can directly pass through due to the anti-reflection film 1422, to greatly reduce the luminous flux of the first polarization state light (p-light) entering the lens due to Fresnel reflection at the interface, to improve the contrast of the projected pictures and solve the problem of ghost.

It can be understood that the reflective polarizer 141 can reflect p-light and transmit s-light, when the first polarization state light is s-light, the second polarization state light is p-light, the principle is the same as above, and will not be repeated.

The anti-reflection film 1422 may be formed on a surface of a side of the glass substrate 1421 away from the reflective polarizer 141 by using a process such as coating, sputtering, or chemical vapor deposition (CVD). The anti-reflection film 1422 may be a multi-layer film structure to increase the transmittance of the glass substrate 1421 and reduce the reflectivity at the interface between the glass substrate 1421 and the air. The anti-reflection film 1422 is provided on the side of the glass substrate 1421 away from the reflective polarizer 141, so that the reflectivity between the glass substrate 1421 and the air is less than a preset reflectivity $\delta$, which is less than $1/(5*CR)$, where CR is the ANSI contrast achievable to a monolithic LCD projector. Generally speaking, the ANSI contrast CR is about 100:1 to 2000:1.

It should be noted that the modulated light incident on the reflective polarizer 141 has a certain light cone angle, and the criteria discussed above hold for different angles of light. In addition, the criteria discussed above also hold for different wavelengths of light. In fact, the reflectivity and cutoff wavelength of s-light and p-light will be different when there is a certain angle of incidence, which also needs to be considered when designing the anti-reflection film.

The lens 150 is provided in the reflected light path of the analyzer for projecting the second polarization state light reflected from the reflective polarizer 141 to form a projected picture on the screen or wall. The common lens is composed of three or four glass lenses, or may be composed of more lenses, and the lens material may also be optical plastic.

In the above embodiment, since the analyzer 140 is separated from the LCD panel 130, the heat generated by the analyzer 140 is avoided to be directly conducted to the LCD panel 130, thus the problem is solved that the temperature of the LCD panel 130 increases due to the heat absorption of the analyzer 140. The analyzer 140 includes a reflective polarizer 141 and a functional structure 142, and the reflective polarizer 141 reflects the second polarization state light used to form the projected pictures to the lens 150, and the functional structure 142 makes a ratio to be less than a preset value, the ratio is of a luminous flux of the first polarization state light in a reflected light path of the reflective polarizer to a luminous flux of the first polarization state light emitted from the LCD panel, the first polarization state light which is not beneficial to the projected pictures and enters the lens can be reduced or eliminated, to improve a contrast of the projected pictures and solve a problem of ghost.

Second Embodiment

Figure 4:
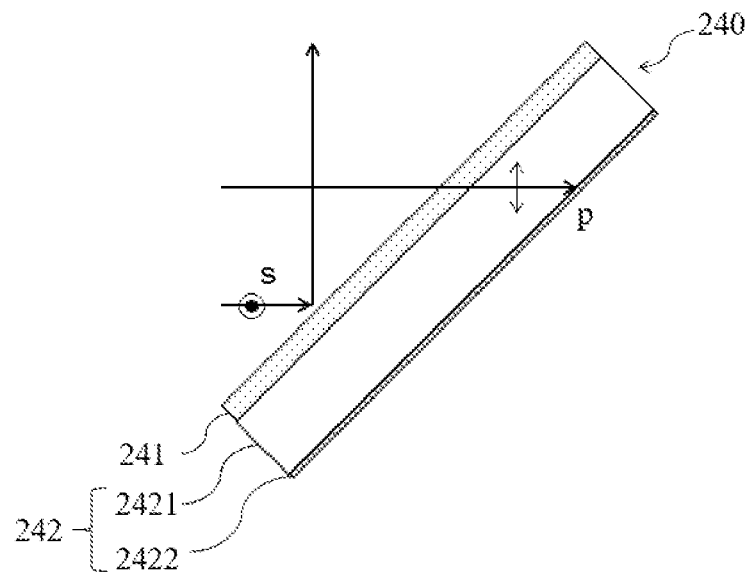
FIG. 4 is a schematic structural view of the analyzer according to a second embodiment of the present application.

FIG. 4 is a schematic structural view of the analyzer 240 according to the second embodiment of the present application. Different from the first embodiment, the analyzer 240 in this embodiment includes a reflective polarizer 241 and a glass substrate 2421 and a light-absorbing film 2422. The glass substrate 2421 is attached to the side of the reflective polarizer 241 away from to the LCD panel 130, and the light-absorbing film 2422 is provided on a side of the glass substrate 2421 away from to the reflective polarizer 241. The glass substrate 2421 and the light-absorbing film 2422 form a functional structure 242.

In the above embodiment, since light-absorbing film 2422 is provided on the side of the glass substrate 2421 away from the reflective polarizer 241, the light-absorbing film 2422 is used to absorb the first polarization state light passing through the reflective polarizer 241, the first polarization state light which is not beneficial to the projected pictures and enters the lens can be reduced or eliminated, to improve a contrast of the projected pictures and solve a problem of ghost. The light-absorbing film 2422 can be made of light-absorbing paint, or can be provided with carbon nanotubes, or designed with light-absorbing micro-nano structures, etc. A light absorption rate of the light-absorbing film is greater than 98%, to absorb the vast majority of the first polarization state light through the reflective polarizer 241.

Third Embodiment

Figure 5:
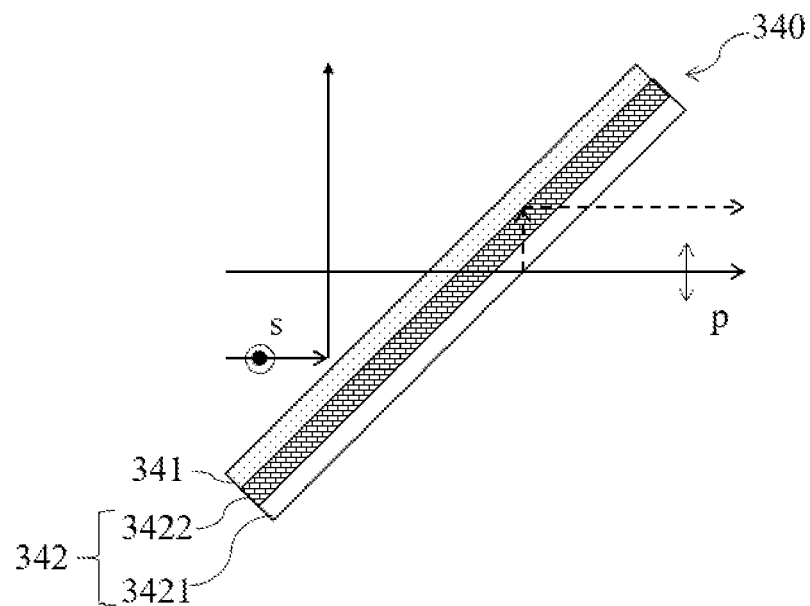
FIG. 5 is a schematic structural view of the analyzer according to a third embodiment of the present application.

FIG. 5 shows a schematic structural view of the analyzer 340 according to the third embodiment of the present application. Different from the first embodiment, the analyzer 340 in this embodiment includes a reflective polarizer 341, a quarter wave plate 3422 and a glass substrate 3421 layered in sequence. The quarter wave plate 3423 is attached to the side of the reflective polarizer 341 away from to the LCD panel 130, and the glass substrate 3421 is attached to a side of the quarter wave plate 3422 away from to the reflective polarizer 341. The quarter wave plate 3422 and the glass substrate 3421 form a functional structure 342.

The modulated light emitted from the LCD panel 130 includes a first polarization state light (p-light) and a second polarization state light (s-light). The s-light is reflected by the reflective polarizer 341 and enters the lens 150, the p-light passes through the reflective polarizer 341 and the quarter wave plate 3422 and enters the glass substrate 3421. Most of the light passes through the glass substrate 3421 directly to the outside world. A small portion of the light is reflected by the interface between the glass substrate 3421 and the air, and then passes through the quarter wave plate 3422 again, at this time, the polarization state of the small portion of the light has been rotated by 90 degrees to become the s-light, which will be reflected by the reflective polarizer 341. The small portion of the light is then reflected back to the polarization state of the p-light of the reflective polarizer 341 on the interface between the glass substrate 3421 and the air, that is, back to the original polarization state which can be transmitted by the reflective polarizer 341. However, considering that a reflectivity of the interface is generally 4%, the ratio of the light after two reflections to the first polarization state light (p-light) which is initially incident to the reflective polarizer 341 is less than 2 per thousand. In the above embodiment, by providing a quarter wave plate 3422 between the reflective polarizer 341 and the glass substrate 3421, the first polarization state light which is not beneficial to the projected pictures and enters the lens can be reduced or eliminated, to improve a contrast of the projected pictures and solve a problem of ghost.

In an embodiment, an anti-reflection film or light-absorbing film can also be provided on a side of the glass substrate 3421 away from to the reflective polarizer 341. That is, the analyzer includes: a reflective polarizer 341, a quarter wave plate 3422, a glass substrate 3421 and an anti-reflection film layered in sequence. The combination of the quarter wave plate 3422 and the anti-reflection film effectively reduces the requirement for anti-reflection film reflectivity, and the first polarization state light which is not beneficial to the projected pictures and enters the lens can be reduced or eliminated, to improve a contrast of the projected pictures and solve a problem of ghost.

The analyzer includes: a reflective polarizer 341, a quarter wave plate 3422, a glass substrate 3421 and a light-absorbing film layered in sequence. In this embodiment, the combination of the quarter wave plate 3422 and the light-absorbing film can effectively reduce the light absorption requirement of the light-absorbing film, and the first polarization state light which is not beneficial to the projected pictures and enters the lens can be reduced or eliminated, to improve a contrast of the projected pictures and solve a problem of ghost.

Fourth Embodiment

Figure 6A:
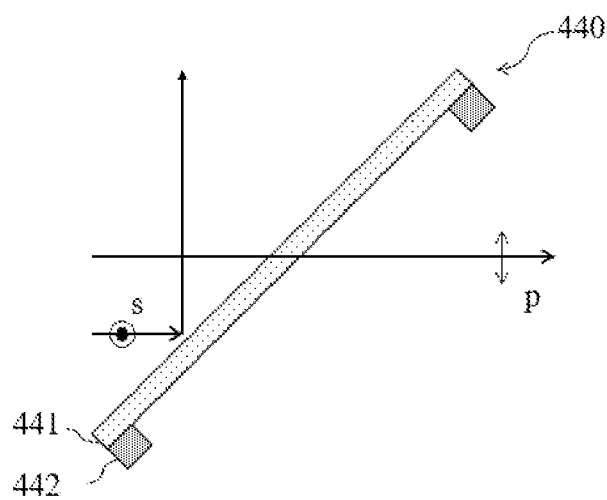
FIG. 6a is a side view of the analyzer according to a fourth embodiment of the present application.
Figure 6B:
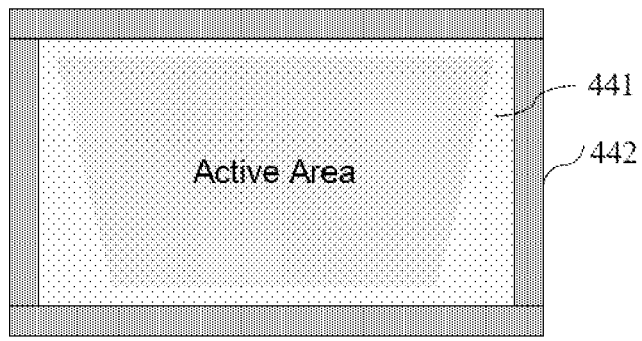
FIG. 6b is a main view of the analyzer according to the fourth embodiment of the present application.

FIG. 6a shows a side view of the analyzer 440 according to a fourth embodiment of the present application, and FIG. 6b shows a main view of the analyzer 440 according to the fourth embodiment of the present application. Different from the first embodiment, the analyzer 440 in this embodiment includes a reflective polarizer 441 and a support frame 442. The support frame 442 is fixed to the side of the reflective polarizer 441 away from to the LCD panel 130, and the support frame 442 is fixed to an edge area of the reflective polarizer 441, to avoid an active area located within the edge area of the reflective polarizer 441, so that the active area of the reflective polarizer 441 is in a suspended state. The support frame 442 is the functional structure in this embodiment. The area of the active area of the reflective polarizer 441 is greater than or equal to the maximum area of that the modulated light emitted from the LCD panel is projected onto the reflective polarizer 441. In this embodiment, the support frame 442 may be a rectangular frame, formed by four edges joined in sequence from the beginning to the end, the rectangular frame is fixed to four edges of the side of the reflective polarizer 441 away from the LCD panel 130.

In the above embodiment, the reflective polarizer 441 is fixed by the support frame 442, so that the active area of the reflective polarizer 441 is in suspension, to avoid the use of a glass substrate on the back of the active area of the reflective polarizer 441. Since the reflective polarizer 441 is generally thin and under the condition that there is no additional refractive index mismatch of the glass substrate, the reflection effect of the interface between the reflective polarizer 441 and the air will be greatly reduced, and the first polarization state light which is not beneficial to the projected pictures and enters the lens can be reduced or eliminated, to improve a contrast of the projected pictures and solve a problem of ghost.

The above mentioned is only a preferred embodiment of the present application, and is not intended to limit the present application. Any modification, equivalent replacement, improvement, etc. made within the spirit and principles of the present application shall be included in the scope of protection of the present application.

What is claimed is:
1. A monolithic liquid crystal display (LCD) projector, comprising:
    a light source;
    a polarizer, provided on a light emitting side of the light source and configured for converting light emitted from the light source into linearly polarized light;
    an LCD panel, provided on a light emitting side of the polarizer and configured for modulating the linearly polarized light according to an image signal to generate modulated light, wherein the modulated light comprises a first polarization state light and a second polarization state light;
    an analyzer, provided on a light emitting side of the LCD panel and separated from the LCD panel, wherein the analyzer is obliqued to an optical axis of the modulated light emitted from the LCD panel, the analyzer comprises a reflective polarizer and a functional structure that is provided on a side of the reflective polarizer away from the LCD panel, the reflective polarizer is configured for reflecting the second polarization state light and transmitting the first polarization state light, the functional structure is configured for making a ratio to be less than a preset value, the ratio is of a luminous flux of the first polarization state light in a reflected light path of the reflective polarizer to a luminous flux of the first polarization state light emitted from the LCD panel, wherein an obliqued angle between the analyzer and the optical axis of the modulated light emitted from the LCD panel is 45°, and the second polarization state light is configured to form projected pictures; and
    a lens, provided in a reflected light path of the analyzer and configured for projecting the second polarization state light reflected by the reflective polarizer, wherein the reflective polarizer comprises a multilayer thin-film stack configured to lower the ratio.

2. The monolithic LCD projector according to claim 1, wherein the functional structure comprises a glass substrate and an anti-reflection film, the glass substrate is attached to the side of the reflective polarizer away from the LCD panel, and the anti-reflection film is provided on a side of the glass substrate away from the reflective polarizer.

3. The monolithic LCD projector according to claim 2, wherein a reflectivity between the functional structure and air is less than a preset reflectivity δ, the preset reflectivity δ is less than 1/(5*CR), wherein CR is an ANSI contrast achievable to the monolithic LCD projector.

4. The monolithic LCD projector according to claim 1, wherein the functional structure comprises a glass substrate and a light-absorbing film, the glass substrate is attached to the side of the reflective polarizer away from the LCD panel, and the light-absorbing film is provided on a side of the glass substrate away from the reflective polarizer.

5. The monolithic LCD projector according to claim 4, wherein the light-absorbing film is made of light-absorbing paint, carbon nanotubes or light-absorbing micro-nano structures.

6. The monolithic LCD projector according to claim 1, wherein the functional structure comprises a quarter wave plate and a glass substrate, the quarter wave plate is attached to the side of the reflective polarizer away from the LCD panel, and the glass substrate is attached to a side of the quarter wave plate away from the reflective polarizer.

7. The monolithic LCD projector according to claim 6, wherein an anti-reflection film or a light-absorbing film is provided on a side of the glass substrate away from the quarter wave plate.

8. The monolithic LCD projector according to claim 1, wherein the functional structure comprises a support frame, and the support frame is fixed to the side of the reflective polarizer away from the LCD panel and fixed to an edge area of the reflective polarizer.

9. The monolithic LCD projector according to claim 8, wherein the support frame is a rectangular frame, and the rectangular frame is fixed to four edges of the side of the reflective polarizer away from the LCD panel.

10. The monolithic LCD projector according to claim 1, wherein the preset value is less than 1:100.

* * * * *